United States Patent [19]
Johnson

[11] Patent Number: 4,553,781
[45] Date of Patent: * Nov. 19, 1985

[54] STREAMLINING APPARATUS FOR SEA/LAND CONTAINERS

[76] Inventor: David W. Johnson, 1884 Sunset Blvd., San Diego, Calif. 92103

[*] Notice: The portion of the term of this patent subsequent to Jan. 24, 2001 has been disclaimed.

[21] Appl. No.: 519,076

[22] Filed: Aug. 1, 1983

Related U.S. Application Data

[63] Continuation-in-part of Ser. No. 337,809, Jan. 8, 1982, Pat. No. 4,427,229.

[51] Int. Cl.$^4$ ............................................. B62D 35/00
[52] U.S. Cl. ..................................................... 296/1 S
[58] Field of Search .............. 296/1 S; 52/2; 224/316, 224/318, 320

[56] References Cited

U.S. PATENT DOCUMENTS 4,030,779  6/1977  Johnson ................................ 296/1 S
4,088,362  5/1978  Mollura ................................ 296/1 S Primary Examiner—Robert R. Song
Attorney, Agent, or Firm—Ralph S. Branscomb

[57] ABSTRACT

An apparatus specifically designed for use on sea/land containers takes advantage of the lifting holes, which are standard on shipping containers, to attach brackets which mount pulleys and a winch which, together with a cable, a strap and two chains, will enable a man standing on the ground to hoist up a preferably inflatable fairing body, which stays with the container while it is on land, and is deflated and removed when the container is to be shipped by sea again.

22 Claims, 8 Drawing Figures

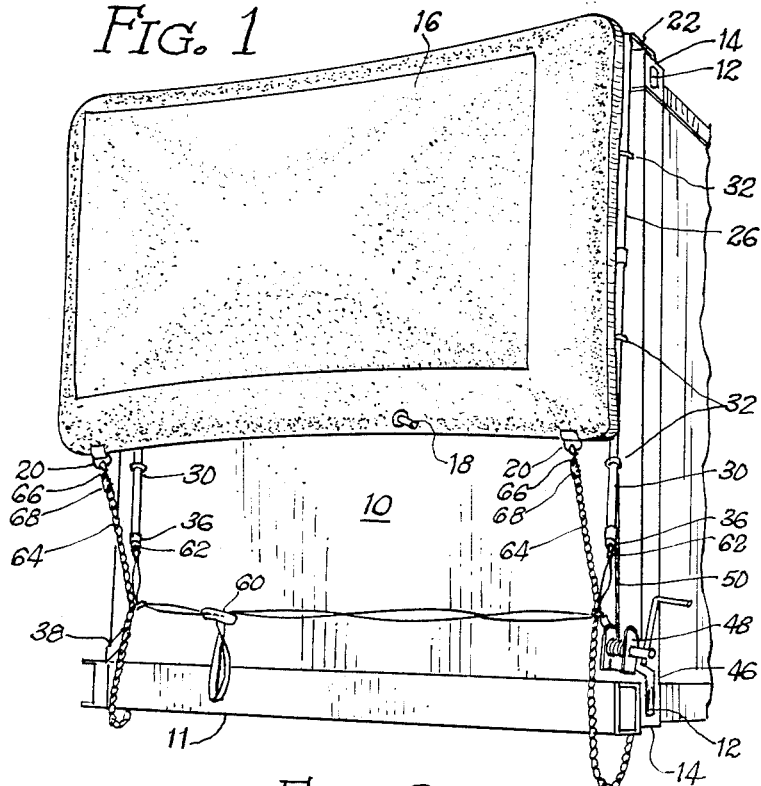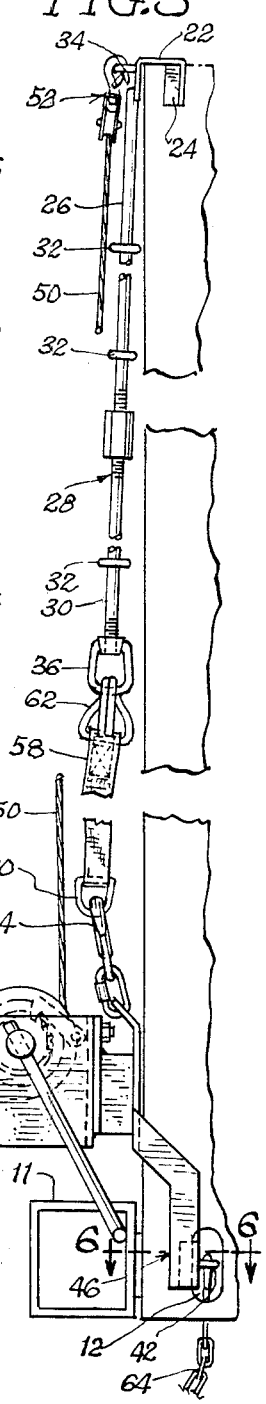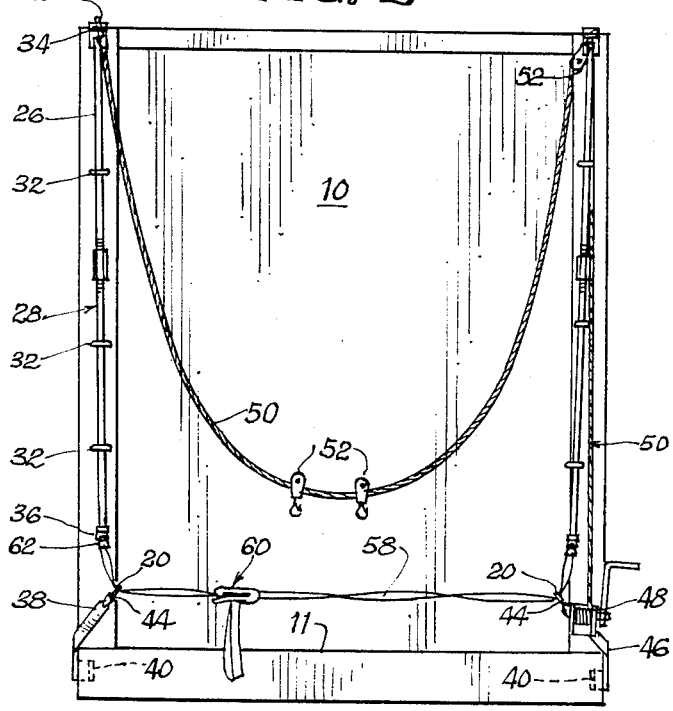

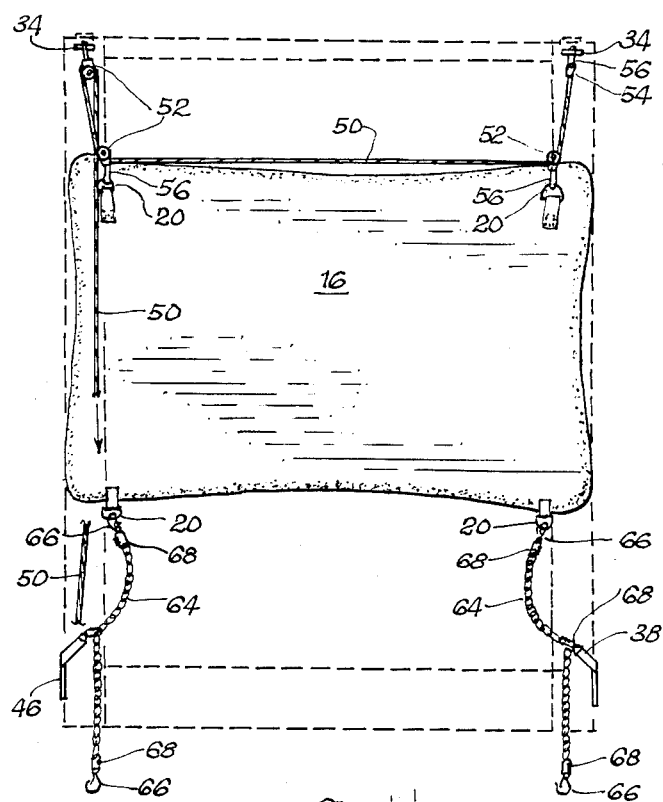
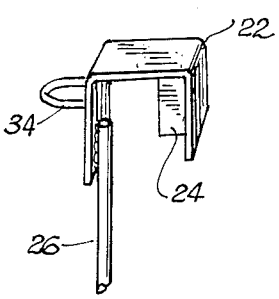
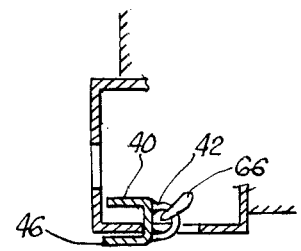
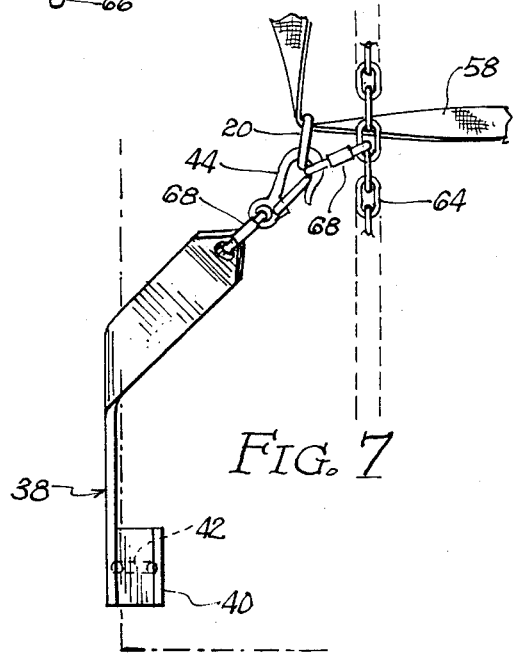
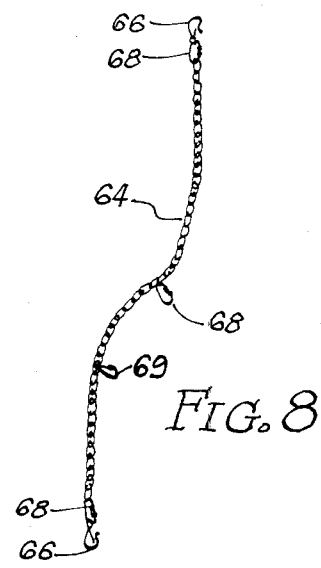

4,553,781

STREAMLINING APPARATUS FOR SEA/LAND CONTAINERS

BACKGROUND OF THE INVENTION

The invention is in the field of drag reduction fairings for motor vehicles, and more particularly relates to inflatable fairings, and to sea/land containers. This application is a continuation-in-part of application Ser. No. 337,809, filed 01/08/82, now U.S. Pat. No. 4,427,229 for a Streamlining Apparatus. The disclosure in the parent application also related to an inflatable fairing for sea/land containers, but differed in detail from the instant disclosure, and in the fact that it had no winch to raise the fairing into position as does the instant invention.

The fact that a fairing added to the bluff front of a vehicle moving through the atmosphere greatly reduces wind resistance, and thus significantly increases fuel mileage is well known. As a result, fairings are a common sight on semi-trailers, some of them mounted on the front of the trailer itself, and others mounted on the front of the trailer itself, and others mounted on the tractor to deflect wind over the trailer. Most of these fairings are made of fiberglass and are permanently mounted.

Naturally this type of fairing is impractical for seagoing containers, which are steadily increasing in proportion to other means of shipping. In their seagoing phase, the exterior of the container must be flush and clean, and a permanently mounted fairing would partially defeat the packing efficiency which makes the containers so competitive.

If a removable fairing is used, there is a land based problem which must be overcome. A typical owner/operator of a tractor must be able to store the fairing somewhere on his tractor after he drops off the container. He cannot count on picking up another container right away, and may have to carry the fairing around for hundreds of miles before picking up another container.

There is thus the need for a specialized fairing that is not only quickly removable from the front of a container, but is collapsible as well. Such as apparatus was disclosed in the parent application, and is refined and improved in this disclosure.

SUMMARY OF THE INVENTION

The streamlining apparatus set forth in the parent application utilized the lifting holes in the corners of the container for mounting brackets which in turn mounted pulleys and straps to secure an inflatable fairing to the front face of the shipping container. That apparatus, like the instant invention, used mounting poles to which the top brackets were permanently mounted to enable the trucker to conveniently mount them from the ground. However, the prior apparatus used two separate upper pulleys with two separate ropes threaded through the pulleys to enable the trucker to manually hoist the inflated body into place. The instant invention, on the other hand, utilizes a winch that is attached to one of the lower brackets, which winds a single cable.

The cable passes through one pulley above the fairing and at the upper corner of the container, and then makes a loop with the end of the cable fixed to the opposite upper corner of the container. The inflatable fairing is then hoisted into place by virtue of being attached to two pulleys that ride on the loop in the cable, so that a single operation of the winch can raise or lower the inflatable fairing.

The poles, formerly individually held down with individual straps, are now retained with a single adjustable strap that passes through snap hooks on the lower brackets. The lower part of the inflatable is held in place by chains that double as safety chains.

BRIEF DESCRIPTION OF THE DRAWINGS

FIG. 1 is a perspective view of the apparatus mounted on the front of the container;

FIG. 2 is a front elevation view of the container with the poles, the brackets, the cable, the pulleys and the strap in place;

FIG. 3 is a side elevation view of one pole and bracket with portions cut away and showing the sea/land container in phantom;

FIG. 4 is a rear elevation view showing the inflatable being hoisted into place;

FIG. 5 is a perspective view of one of the upper brackets.

FIG. 6 is a section taken along line 6—6 of FIG. 2 showing the bracket and its safety chain connection;

FIG. 7 is an enlarged somewhat diagrammatic view of the lower left portion of FIG. 1; and FIG. 8 illustrates the chain 64 and its hardware.

DETAILED DESCRIPTION OF THE PREFERRED EMBODIMENT

The bluff front of a container is shown in FIGS. 1 and 2 at 10. Every corner of the container has three lifting holes 12 which the crane at the dock uses to load the containers into the cargo holds of the ship and are also used to secure stacked containers at sea to prevent side-to-side motions. These holes are provided in the three orthogonal planes that define each of the corners 14. As best shown in FIGS. 1, 2, and 3 is a frame member of the wheel frame 11, which utilizes a forward hole 12 to secure the container to the chassis.

It has been found that as long as the edges of the fairing body were rounded, it is not very important that the fairing body was not faired to the bluff front of the container completely with a skirt. Therefore, the inflatable body 16 is a pillow-shaped unit the internal details of construction of which are not important to this invention. Suffice it to say that the inflated body has a broad, flat curve at the front and a higher curvature at the sides. One or more filler spouts 18 are provided, and widely spaced pairs of D rings 20 are attached to the top and bottom of the body.

The apparatus uses a mounting bracket at each of the corners, with the upper brackets 22 each having depending detents 24 and being so shaped that when the detents slip into the top ones of the holes 12, the brackets more or less conform to the shape of the corners.

Each of these top brackets 22 is integral with the upper section 26 of pole 28. The upper sections each threadedly engage with the lower sections 30 to make a rigid, integral pole. Grommets or sleeves 32 made of rubber or other somewhat resilient material was spaced along the poles to prevent them from vibrating and marring the container surface. The fronts of the brackets mount eyelets 34, and eye nuts 36 are screwed onto the bottoms of the poles.

The lower left bracket 38 comprises a metal strap with a detent 40 at one end for engaging in the side hole at the lower left corner. Adjacent the end of the strap with the detent is an eyelet 42, and a snap hook 44 with an eye is attached to the top end of the strap.

The lower right bracket 46 is the reverse of the bracket 38 and is otherwise identical except for the addition of the winch 48 which is mounted to the front as best shown in FIG. 3. Both brackets 38 and 46 are shaped so, as shown in FIG. 3, that they will avoid interference with frame member 11 when positioned to the front face of the container. As best shown in FIGS. 1, 3, and 4, a cable 50 is wound on the winch, and engaged at intervals on the cable are three pulley/hook combinations 52. These pulleys are captured on the cable 50 by the eyelet 54 which is formed at one end of the cable 50 and which mounts the removable link 56. The crank handle on the winch is removable and not required for road use.

THE MOUNTING OPERATION

The majority of the hardware items are described above, and the remaining pieces will be picked up in the description of the recommended steps required to mount the apparatus. First, the lower right bracket 46 that mounts the winch is put in place, where it will temporarily rest without support. Then the removable link 56 in the eyelet 54 at the end of the wire rope or cable 50 is engaged in the eyelet 34 of either of the two upper brackets 22, and the respective bracket hooked onto the upper left corner of the container from the ground by manipulating the pole. The three pulley hook combinations 52 slide down the cable during this step as the cable is allowed to unwind freely from the winch and are close at hand by the winch.

Next, of the three pulley hook combinations 52 on the cable, the one closest to the winch is engaged in the eyelet 34 on the other of the brackets 22. While ensuring that ample slack exists in the midsection of the cable between the two brackets to leave the two remaining pulleys 52 within reach from the ground, the bracket is hooked onto the upper right corner of the container.

Now, the lower left bracket 38 can be mounted by slipping it into the lower left side hole and rotating it around to the front, where it will remain without additional support. At this point, all of the brackets are in place, and the poles 28 are dangling from their top supports.

The next step is to secure the bottom ends of the poles. This is done with the adjustable strap 58, made adjustable by the ratchet buckle 60. The strap has a hook 62 at each end. The left hook is hooked onto the eye nut 36 at the bottom of the left pole, and D ring 20 is engaged in the snap hook 44, which is attached to the left bracket by way of the removable link 68. The right hand pole and bracket are similarly attached to the right-hand side of the strap, and the ratchet buckle 60 is then cinched down tight to securely restrain the poles and lower brackets.

All of the structure needed to hoist up the inflated body 16 is now in place, and that is the next step. The two remaining pulley/hooks 52 on the midsection of the cable are at this point on the loop of cable defining the midsection, and are at the level of the winch. They are now engaged in the upper two D rings 20 attached to the back of bag 16 as best shown in FIG. 4, and the winch operated to partially raise the body. Note that the inflatable at this point could be either inflated, or deflated, the steps being the same except for the timing of the inflation step.

Two chains 64 each having hooks 66 on either end and openable side link 68 at both ends and in its midsection, are now used to tie down the bottom of the inflatable. One end of each chain is hooked to each of the bottom D rings 20. The openable links 68 on the midsections of the chain are engaged on the snap hooks 44, which are already engaging the D rings on the strap 58. The spacing between the first hooks and the openable link at midsection are pre-set so that when the body is hoisted into its final position as shown in FIG. 1, the upper sections of the chains are taut to securely hold down the lower portion of the inflatable.

The lower ends of the chains are now run through the respective ones of the holes 12 in the bottom of the front corner, and brought inside the corners where they are hooked at their lower ends to the eyelets 42 of the lower brackets to act as safety chains. The apparatus is now in place and ready for the road.

A second type of container, one called a "high cube" is identical to 10 in FIG. 2 in all respects except it is one foot taller in height. This apparatus can be installed on a taller container. This is accomplished first via the strap 58 being adjustable and of sufficient length to accommodate an extra one foot distance between the poles and lower brackets. Second, an additional openable link 69 shown in FIG. 8 is added to the midsection of chains 64, also preset so that when the body is hoisted into its final taller position, the upper section of the chains are taut to securely hold down the lower portion of the inflatable.

Although a number of steps are required to mount the apparatus, in practice once they have been performed a time or two they can be completed in about two minutes. The estimated fuel savings is at least 10% so that clearly on a long haul, for example from the west or east coast to the midwest, the savings far outweigh the time involved installing and removing the apparatus.

While the preferred embodiment of the invention have been described, other modifications may be made thereto and other embodiments may be devised within the spirit of the invention and the scope of the appended claims.

What is claimed is:

1. An apparatus for mounting a drag-reducing body on the bluff front face of a vehicle, comprising:
   (a) a cable;
   (b) an anchor means for securing one end of said cable adjacent an upper portion of said face;
   (c) a pulley and pulley mounting means mounting same adjacent an upper portion of said face spaced from said anchor means;
   (d) said cable passing from said anchor means through said pulley defining a midsection between said anchor means and an extensible end beyond said pulley extensible to vary the slack in said midsection;
   (e) means on said cable midsection for engaging an upper portion of a drag reducing body;
   (f) means on said vehicle for holding a lower portion of said body down against said bluff face, whereby said body can be engaged in a lowered position by the slack midsection of said cable, raised into operative position by pulling the extensible end of said cable, and the lower portion of said body held against said face.

2. Structure according to claim 1 wherein said body has a pair of rings on top and said means on said cable midsection comprises pulleys riding on said midsection and having hooks to engage said rings, whereby all of said pulleys can be bunched together on said cable when not in use.

3. Structure according to claim 1 wherein said body is a land/sea container having four corners of the front face with lifting holes, and said anchor means and pulley mounting means comprise upper brackets engageable in the holes in the respective opposite upper front corners of the front face.

4. Structure according to claim 3 wherein said brackets are mounted on the ends of poles such that they can be engaged from ground level.

5. Structure according to claim 4 and including an adjustable strap connectable to the bottoms of said poles, and means for securing said strap to a lower portion of said face to hold said poles in place.

6. Structure according to claim 4 wherein said poles are sectional and have spaced resilient bumper sleeves to prevent vibration and marring said face.

7. Structure according to claim 4 wherein said means for holding a lower portion of said body against said bluff face comprises a pair of lower brackets mounted in the holes of the respective opposite lower corners of the bluff face, and tether means connecting said lower brackets to the lower portion of said body.

8. Structure according to claim 7 wherein one of said lower brackets mounts a winch, and the extensible end of said winch is operatively engaged on said winch.

9. Structure according to claim 7 wherein said means comprises chains and in addition to tethering said body, said chains pass through holes in the lower front corners of the vehicle and connect to said respective brackets a second time for added safety.

10. Apparatus for attaching a drag-reducing body to the four-cornered bluff front of a land/sea container having three lifting holes in orthogonal planes in each corner, said apparatus comprising:
(a) four brackets engageable in at least one of said lifting holes in the respective ones of the four corners of said bluff face;
(b) tether means extending between said brackets and said body.

11. Structure according to claim 10 wherein two of said brackets are upper brackets each having depending detents to engage in the top holes of the respective upper corners of said face.

12. Structure according to claim 10 wherein two of said brackets are lower brackets having detents engageable in the side holes of the lower corners of said face, said lower brackets each having a strap extending upwardly and around the front edge of, and across a portion of, said face.

13. Structure according to claim 12 wherein said straps are rigid and shaped to remain in position without auxiliary support while rigging the apparatus.

14. Structure according to claim 13 wherein said tether means includes a cable, a first of said upper brackets attaches to a fixed end of said cable, the second of said brackets mounting a pulley with said cable passing therethrough to define an extensible end, and the midsection of said cable between said brackets is mounted to said body such that same can be raised and lowered by operating the extensible end of said cable.

15. Structure according to claim 14 wherein the lower bracket on the same side of said face as said second upper bracket mounts a winch, and the extensible end of said cable is wound on said winch.

16. Structure according to claim 10 wherein said upper two brackets are mounted on vertically extended poles when not in use, said lower bracket each defines an eyelet, and including an adjustable strap passing through said eyelet and upward to connect to and tie down the lower ends of said poles.

17. A method of attaching a drag reducing body to the four-cornered bluff front face of a land/sea container having three holes defined in orthogonal planes in each corner, by the use of four brackets which engage in at least one hole of the respective front corner comprising the following steps:
(a) engaging said four brackets on the respective four corners of said bluff face;
(b) tethering said body to said brackets.

18. Structure according to claim 17 wherein the upper two brackets are on poles and step (a) includes positioning said upper two brackets by manipulating said poles from the ground.

19. Structure according to claim 18 wherein step (b) includes cinching down the bottom ends of said poles to a lower portion of the vehicle.

20. Structure according to claim 17 wherein one of said upper brackets mounts a pulley, and one of said lower brackets mounts a winch having a cable which passes up through said pulley and down into engagement with said body, and step (a) includes operating said winch to winch said body into position.

21. Structure according to claim 20 wherein said lower two brackets mount chains of predetermined length connectable to lower portions of said body to automatically tension said body when same is winched to the proper operating height and step (b) includes attaching said chains to lower portions of said body.

22. A method according to claim 17 wherein step (a) comprises engaging the upper two of said brackets in the top holes in the respective corners, and engaging the lower two of said brackets in the side holes of the respective lower corners.

* * * * *